(12) United States Patent
Ianelli

(10) Patent No.: US 10,348,360 B2
(45) Date of Patent: Jul. 9, 2019

(54) SIGNAL REPRESENTING DATA, METHOD AND DEVICE FOR GENERATING SUCH SIGNAL AND METHOD AND DEVICE FOR DETERMINING THE REPRESENTED DATA FROM SUCH SIGNAL

(71) Applicant: BroadNet Invest AG, Engelberg (CH)

(72) Inventor: Zbigniew Ianelli, Berlin (DE)

(73) Assignee: BROADNET INVEST AG, Engelberg (CH)

( * ) Notice: Subject to any disclaimer, the term of this patent is extended or adjusted under 35 U.S.C. 154(b) by 0 days.

(21) Appl. No.: 15/956,428

(22) Filed: Apr. 18, 2018

(65) Prior Publication Data

US 2018/0241431 A1 Aug. 23, 2018

Related U.S. Application Data

(62) Division of application No. 14/891,373, filed as application No. PCT/EP2014/059811 on May 14, 2014, now Pat. No. 9,960,806.

(30) Foreign Application Priority Data

May 14, 2013 (EP) .................................... 13167573

(51) Int. Cl.
*H04B 1/7073* (2011.01)
*H04B 1/707* (2011.01)
(Continued)

(52) U.S. Cl.
CPC .......... *H04B 1/7073* (2013.01); *H04B 1/707* (2013.01); *H04L 27/2082* (2013.01); *H04B 2001/6908* (2013.01); *H04B 2201/7073* (2013.01)

(58) Field of Classification Search
CPC .................................................. H04B 1/7073
(Continued)

(56) References Cited

U.S. PATENT DOCUMENTS 5,268,926 A 12/1993 Sebilet
5,960,028 A 9/1999 Okamoto et al.
(Continued)

FOREIGN PATENT DOCUMENTS

| CN | 101069362 | 11/2007 |
|---|---|---|
| CN | 101604985 | 12/2009 |
| JP | H09284176 A | 10/1997 |

OTHER PUBLICATIONS

Tsai, Y., "M-ary spreading-code-phaseshif-keying modulation of DSSS multiple access systems," IEEE Transactions on Communication, vol. 57, issue: 11, pp. 3220-3227, Nov. 2009.
(Continued)

*Primary Examiner* — Lihong Yu
(74) *Attorney, Agent, or Firm* — Fox Rothschild LLP

(57) ABSTRACT

A method and a device are described for determining data from a signal spread over at least one frequency base band representing the data. The method for generating a signal has a step of using at least one highly auto-correlated spread code sequence (1C, 2C) associated with the frequency base band for determining a delay with which a modulated portion (1P, 2P) of the data is spread on the signal. The method has further steps of determining said modulated portion from the signal using the delay and the spread code sequence (1C, 2C), of demodulating the modulated portion (1P, 2P) using phase shift keying, and of determining a remainder (1R, 2R) of the data using the delay.

4 Claims, 6 Drawing Sheets

(51) Int. Cl.
*H04L 27/20* (2006.01)
*H04B 1/69* (2011.01)

(58) Field of Classification Search
USPC .......................................................... 375/138
See application file for complete search history.

(56) References Cited

U.S. PATENT DOCUMENTS

| 6,396,869 B1 | 5/2002 | Park et al. |
| 2003/0118127 A1 | 6/2003 | Peting |
| 2007/0146090 A1 | 6/2007 | Carey et al. |

OTHER PUBLICATIONS

Shannon, C., "Communication in the Presence of Noise," Proceedings of the IEEE, vol. 86, No. 2, Feb. 1998.
Nyquist, H., "Certain Topics in Telegraph Transmission Theory," Proceedings of the IEEE, vol. 90, No. 2, Feb. 2002.
International Search Report from PCT/EP2014/059811 dated Sep. 10, 2014.

SIGNAL REPRESENTING DATA, METHOD AND DEVICE FOR GENERATING SUCH SIGNAL AND METHOD AND DEVICE FOR DETERMINING THE REPRESENTED DATA FROM SUCH SIGNAL

CROSS-REFERENCE TO RELATED APPLICATIONS

The present application claims priority to U.S. patent application Ser. No. 14/891,373, filed on Nov. 16, 2015 which claims priority to International Patent Application No. PCT/EP2014/059811, filed May 14, 2014, which claims priority to European Patent Application No. 13167573.8, filed May 14, 2013, the contents of all of which are incorporated by reference in their entirety as if fully set forth herein.

BACKGROUND

In telecommunication and radio communication, data can be represented by narrow frequency band signals generated using shift keying techniques. There are different forms of shift keying those related to amplitude shift keying (ASK) or frequency shift keying (FSK) and those related to phase shift keying (PSK) such as binary phase shift keying (BPSK), quadrature phase shift keying (QPSK) and offset quadrature phase shift keying (O-QPSK).

In order to achieve resistance to natural interference, noise and jamming, to prevent detection, and to limit power flux density the resulting narrow band signal is not transmitted as such but spread over a larger or wider frequency band.

Spread-spectrum telecommunications is a signal structuring technique that employs direct sequence, frequency hopping, or a combination of both.

Spread spectrum generally makes use of a sequential noise-like signal structure to spread the normally narrow-band information signal over a wider band of frequencies (wideband radio). The receiver correlates the received signals to retrieve the original information signal.

Frequency-hopping spread spectrum (FHSS), direct-sequence spread spectrum (DSSS), time-hopping spread spectrum (THSS), chirp spread spectrum (CSS), and combinations of these techniques are forms of spread spectrum. Each of these techniques employs pseudorandom number sequences—created using pseudorandom number generators—to determine and control the spreading pattern of the signal across the allocated bandwidth.

DSSS uses a signal structure in which the sequence of chips produced by the transmitter is already known by the receiver. The receiver can then use the same pseudo noise code symbol sequence to counteract the effect of the pseudo noise code symbol sequence on the received signal in order to reconstruct the information signal. DSSS phase-modulates a sine wave pseudo randomly with a continuous string of pseudo noise code symbols called "chips", each of which having a much shorter duration than an information bit. That is, each information bit is modulated by a sequence of much faster chips. Therefore, the chip rate is much higher than the information signal bit rate.

Another standard, IEEE 802.15.4-2006, covers several physical layers, using several modulation techniques, operating in wide range of the frequencies, where three major frequency bands are utilized, i.e. sub-GHz (between: 314 MHz and 956 MHz), 2.45 GHz ISM Band (between 2400 MHz and 2483.5 MHz), and ultra wide band (UWB) only: below 1 GHz, between 3 GHz and 5 GHz and between 6 GHz and 10 GHz. In Ultra-wideband (UWB) modulation is commonly based on transmitting short duration pulses. Wireless Ethernet standard IEEE 802.11 uses either FHSS or DSSS in its radio interface.

One of the most interesting sub-GHz Bands is called "g1" Band, covering frequencies between 868.0 MHz and 868.6 MHz. Frequency bandwidth is narrow—only 600 kHz—preventing high data rates in wireless communication where simple modulation schemes are used.

According to the IEEE standard 802.15.4-2006, 250 kbps is the maximum possible gross data rate specified for the 868.3 MHz band of 600 kHz frequency bandwidth, the "g1" band. But due to the narrow frequency bandwidth, prior art implementations exhibit in practice much lower values of the gross data rate—in order of 100 kbps, maximally.

Tsai Y., Mary spreading-code-phase-shift-keying modulation for DSSS multiple access systems, IEEE Transactions on Communication, Volume 57, Issue: 11, pages 3220-3224, (November 2009), describes that code shift keying (CSK) was proposed to increase the transmission efficiency of DSSS systems, and to overcome the spreading gain versus data rate limitation and proposes to improve the system flexibility by switching the spreading code phase in accordance with the incoming data.

SUMMARY OF THE INVENTION

This invention provides a modulation scheme enabling increased data rate. The invention is applicable in particular in the frequency band between 868.0 MHz and 868.6 MHz for enabling increased data rate for wireless communication but is neither limited to this band nor limited to wireless communication.

In particular the invention provides, in one aspect, a method for determining data from a signal spread over at least one frequency base band; and in another aspect a device for determining data from a signal spread over at least one frequency base band.

The method for determining data comprises using at least one highly auto-correlated spread code sequence associated with the frequency base band for determining at least one delay with which a modulated portion of the data is spread over the signal, using the spread code sequence and the delay for determining, from the signal, the modulated portion of the data, demodulating the modulated portion of the data using phase shift keying, and determining a remainder of the data using the delay. The device for determining data comprises corresponding means.

In an embodiment of the invention, the signal may comprise the portion modulated on the at least one baseband as one of an I component and a Q component according to offset quadrature phase shift keying.

Then, the signal may further comprise further data of which a portion is modulated on the at least one baseband as the other of the I component and the Q component, the other component being spread with a further spread code time sequence selected from the set of predetermined spread code sequences and delayed by a further delay determined according to a remainder of the further data.

The signal may comprise the portion modulated on different frequency base bands, wherein, for each frequency base band, a different spread code is used.

The data represented by the signal can be Viterbi encoded.

Advantageous embodiments of the invention are specified in the dependent claims and described in the detailed description.

BRIEF DESCRIPTION OF THE DRAWINGS

The accompanying drawings, together with the specification, illustrate exemplary embodiments of the present invention, and, together with the description, serve to explain the principles of the present invention. It shows FIG. 1 relationship between bit error rate, modulation scheme and $E_b/N_0$ factor.

DETAILED DESCRIPTION OF EXEMPLARY EMBODIMENTS

For digital communication system an optimum system can be defined as the system which minimizes probability of bit error rate (BER) at output of the system (receiver side) under constrains of occupied frequency bandwidth and transmitted energy. In case of signal together with white Gaussian noises (AWGN), Claude E. Shannon, Communication in the Presence of Noise. Proc. I.R.E., 37, 1949, pages 10-21, gives the following equation for channel capacity C in bit per second wherein B is the channel bandwidth in Hertz and S/N is the signal to noise power factor in Watt per Watt:

$$C = B * \log_2(1 + S/N) \quad (1)$$

For a predetermined frequency bandwidth B and signal-to-noise ratio S/N, channel capacity C defines the theoretical limit of communication rate R which is possible to realize without errors.

The problem how to shape waveform carrying information which is transported over band limited wireless channel together with frequency response of the channel was analyzed by Harry Nyquist, Certain Topics in Telegraph Transmission Theory, Transactions of the AIEE, vol. 47, February 1928, pages: 617-644. Three different methods are described for eliminating ISI though pulse shaping. For shaping frequency response of the communication channel Raised Cosine-Rolloff Filter can be used.

Maximum baud rate (symbol rate) D that communication system can support without inter-symbol interference (ISI) can be related to the absolute frequency bandwidth B of the system and the roll-off factor r of the Raised-Cosine-Rolloff Filter characteristic.

$$D = 2 * B/(1+r) \quad (2)$$

Unfortunately is impossible to utilize entire available frequency bandwidth due to imprecision of the reference frequency. For typical crystal tolerance ±40 ppm, available frequency bandwidth B in the "g1" band for instance reduces from 600 kHz to 530 kHz.

Though a Rolloff factor of Zero is theoretically possible, achieving roll-off factor below 0.2 is difficult and expensive. Thus, though there is a theoretical Baud Rate limit of 530 kbaud in the g1 band, in practice the limit is about 442 kbaud. That is symbols have to carry more than one bit for conveying data rates of more than 442 kbaud.

Besides channel capacity and resulting limitations energy efficiency is of importance in particular for mobile and/or wireless applications. A way to analyze energy efficiency is investigating the impact of Additive White Gaussian Noise (AWGN) on attenuation of the signal between source (sender/transmitter) and sink (receiver/destination). Additive White Gaussian Noise (AWGN) is parameterized by the scalar value $N_0$ which represents the level of the power spectral density of the white noise and the attenuation is expressed by energy of the bit of information $E_b$ at input to the receiver/destination.

For achieving a same bit error rate at a same power spectral density $N_0$ of noise, assuming AWGN, different modulation schemes require different energy of the bit $E_b$.

Figure 1:
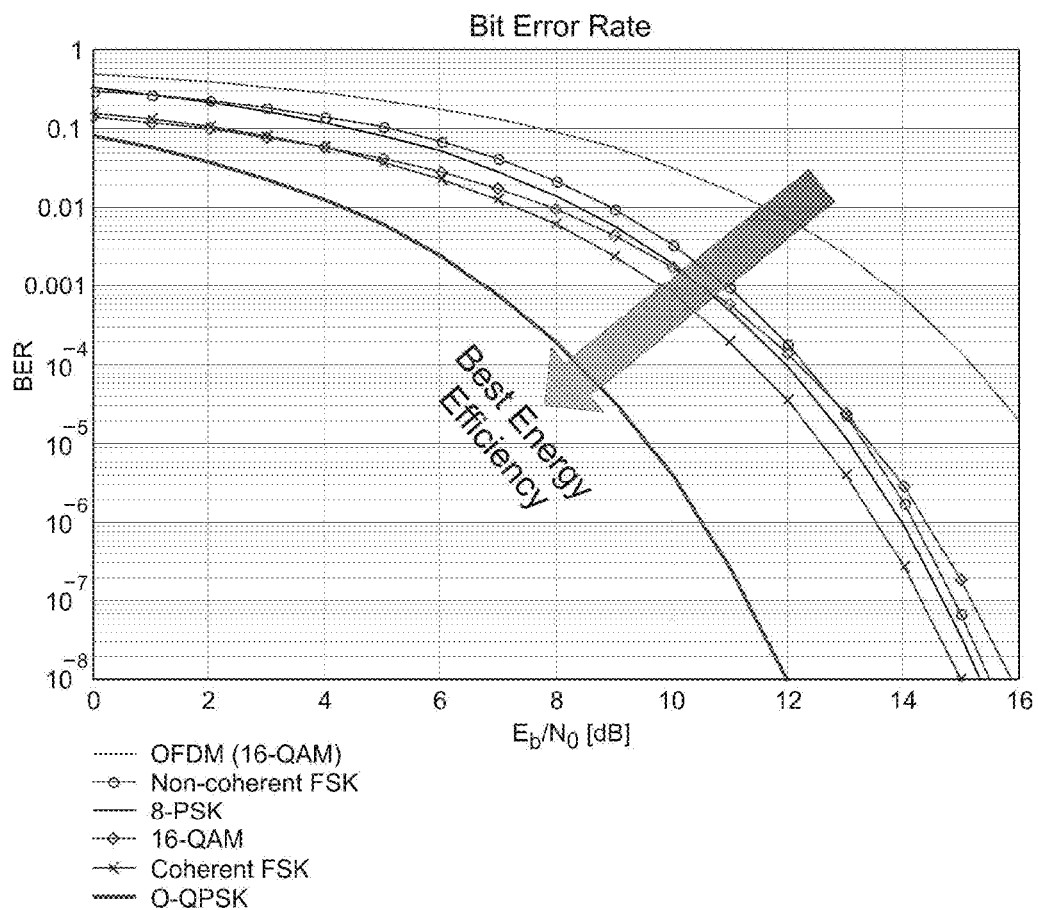

FIG. 1 exemplarily shows relationship between bit error rate, modulation scheme and $E_b/N_0$ ratio. For decreasing $E_b/N_0$ ratio bit error rate increases for each modulation scheme similarly. For each given $E_b/N_0$ ratio, O-QPSK achieves the lowest bit error rate, followed by coherent frequency shift keying, $16^{th}$ order quadrature amplitude modulation (16QAM) and $8^{th}$ order PSK. Highest bit error rates occurred in case of non-coherent frequency shift keying and orthogonal Frequency-Division Multiplexing (OFDM).

Figure 2:
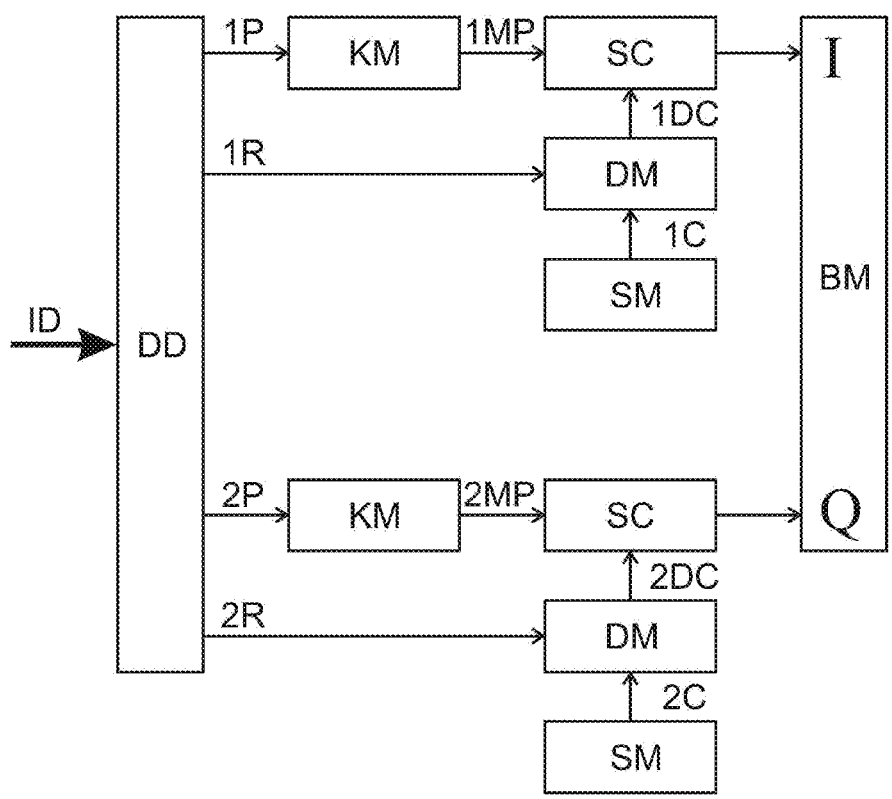
FIG. 2 exemplary block diagram of a first embodiment of the inventive modulation scheme.

In a first exemplary embodiment of the invention, a single layer is used as exemplarily depicted in FIG. 2. That is, input data ID is demultiplexed by data demultiplexer DD into a first and a second portion 1P, 2P, and a first remainder and a second remainder 1R, 2R. From the first and the second portion 1P, 2P a first and a second independent signal 1MP, 2MP are generated by keying module KM according to binary phase shift keying. The first and the second remainder 1R, 2R are used for determining a first and a second delay. From a predetermined set of spread code sequences with high auto correlation and low cross correlation, a first and a second highly auto-correlated spread code sequences 1C, 2C are selected by selecting module SM according to the frequency band. The set can be predetermined according to DSSS, for instance, and the selected spread code sequence 1C, 2C can be associated with the baseband on which the spread signal will be modulated finally. The spread code sequence 1C, 2C may be equal or may differ. The selected first and a second spread code sequence 1C, 2C are delayed individually according to the first and the second remainder 1R, 2R by delaying module DM, the first spread code sequence 1C by the first delay resulting in a first delayed spread code sequence 1DC and the second by the second delay resulting in a second delayed spread code sequence 2DC.

Then, the first independent signal 1MP is spread by spreading module SC over the available frequency band using the delayed first spread code sequence 1C and the second independent signal 2MP is spread over the available frequency band using the delayed second spread code sequence 2C. The spread signals are then modulated by baseband modulator BM on a baseband as I component and Q component according to QPSK.

Apparently, Q component modulation and I component modulation is complete independent from each other. That is, the inventive concept applied in the single layer QPSK system according the first embodiment to one component, can be applied in a single layer BPSK system. Then no demultiplexing occurs and modulation on the baseband is not as either I component or Q component but as is.

The use of the BPSK modulation combined with DSSS of the first exemplary embodiment ensures back-compatibility with legacy devices which are BPSK and DSSS based.

A receiver for retrieving the data from the signal generated according to the first exemplary embodiment of the invention receives the signal and separates it into an I component and a Q component. Each component is de-spread using the respective spread code sequence used for spreading. Through delaying of the respective spread code sequence and controlling the de-spreading result a delay is determined for each component. From the de-spread signal of each component a respective data portion is extracted. Further, from the determined delay a remainder of the data is determined. Finally data portions and data remainders determined for each component are multiplexed for determining the data that was represented by the signal received.

Figure 3:
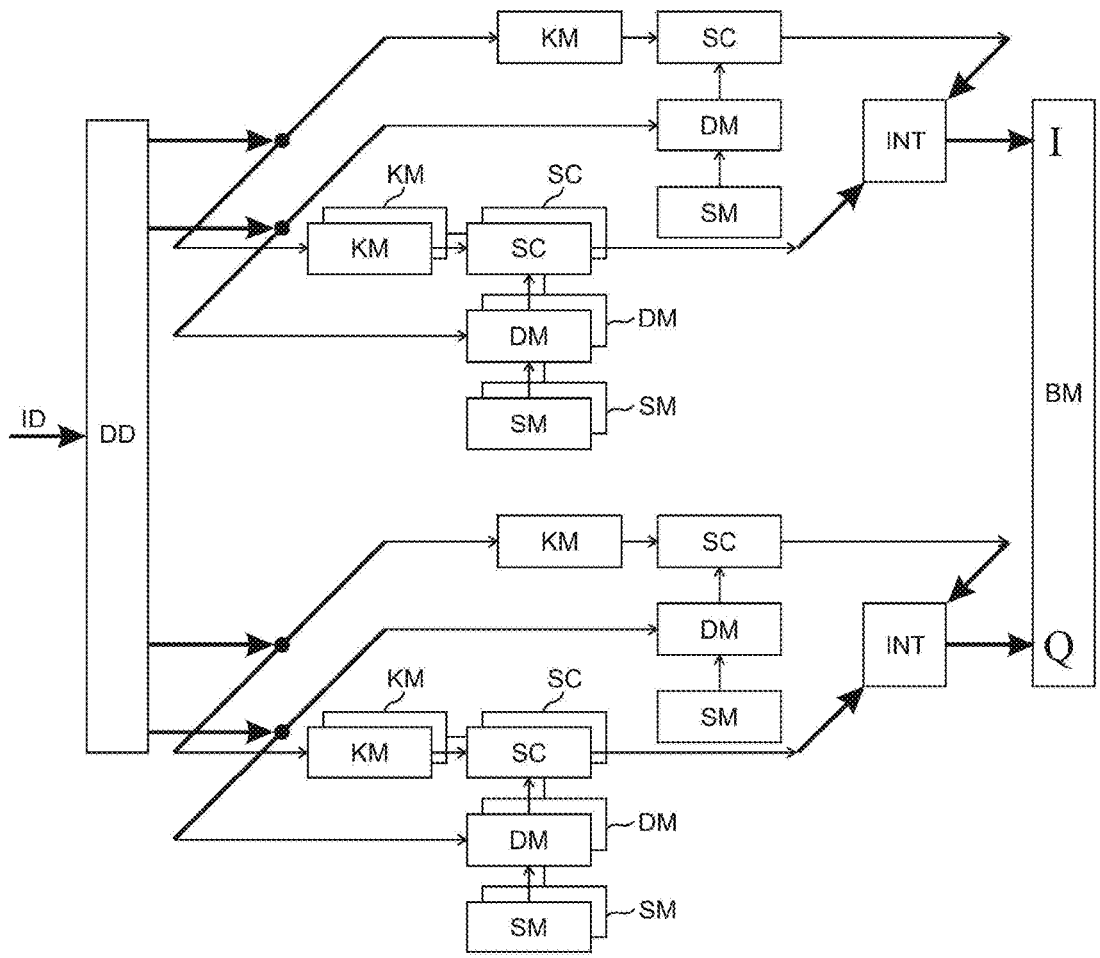
FIG. 3 exemplary block diagram of a second embodiment of the inventive modulation scheme.

In a second exemplary embodiment of the invention, two or more layers are used super positioned or overlaid as exemplarily depicted in FIG. 3. That is, the second exemplary embodiment can be considered an overlay or superposition of several instances of the first exemplary embodiment wherein different DSSS spread code sequences are used in each layer. Among components of a layer, a same spread code sequence can be used. Again quadrature modulation, for instance QPSK or, for even higher bit rates, O-QPSK, is used and bit rate per symbol is increased through delays of the spread code sequences. By a module INT, layer components determined for being modulated on the baseband as I components are summed by module INT and layer components determined for being modulated on the baseband as Q components are summed. The sums of layer components are then modulated on the baseband by the baseband modulator BM.

As the second exemplary embodiment can be considered an overlay or superposition of several instances of the first exemplary embodiment, a receiver for retrieving the data from the signal generated according to the second exemplary embodiment of the invention can be formed by combining a corresponding number of receivers for retrieving data from signals generated according to the first exemplary embodiment.

Figure 4:
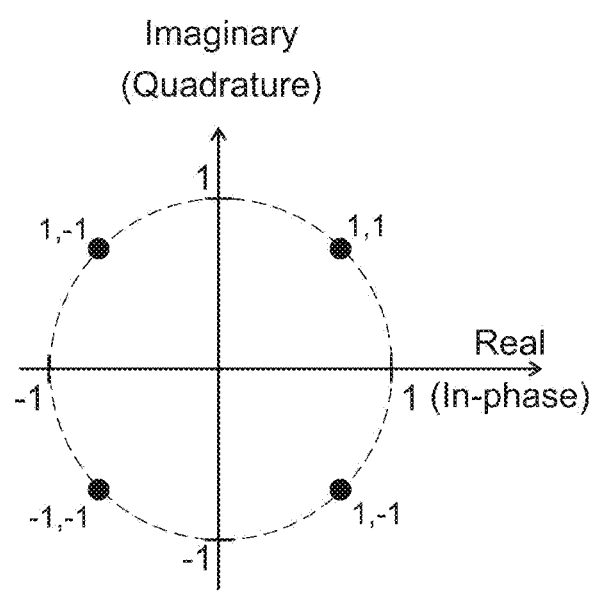
FIG. 4 QPSK Constellation for the first embodiment of the inventive modulation scheme with no delay.

In order to show the flexibility of the first exemplary embodiment, a constant spread code sequence equal to 1, 1C=1 and 2C=1, and no remainders 1R, 2R are exemplarily assumed resulting in no delaying. Then output signal from the Spread Block is equal to the input signal to the Spread Block. For such set-up, QPSK modulation is realized with constellation depicted on FIG. 4.

Figure 5:
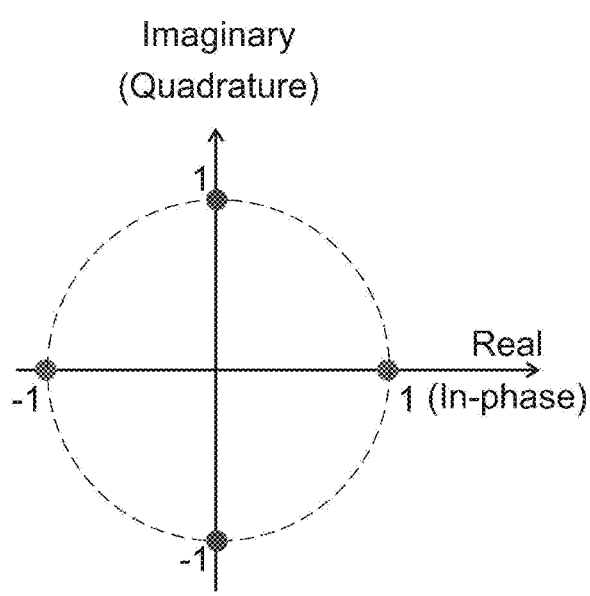
FIG. 5 BPSK Constellation for the first embodiment of the inventive modulation scheme achieved by applying zero spread code to one of the paths.

Deactivating the Data Demultiplexer DD and applying either 1C=0 and 2C=1 or 1C=1 and 2C=0 with zero delays achieves BPSK modulation as depicted in FIG. 5.

In an embodiment the invention makes use of a standardized preamble of eight O-QPSK modulated symbols, i.e. 4 octets of totally 320 µs duration time, which are followed by data rate specific Start-of-Frame Delimiter (SFD) which enables automatic data rate selection of the data stream which follows after SFD. The preamble part is used for conditioning the receiver by settling AGC, synchronizing, phase/frequency offset estimations and the like. The SFD determines the data rate of the message following the SFD and switches the baseband signal processing in such a way that the message received after SFD will be decoded with correctly selected speed.

Experiments have been conducted with a third exemplary embodiment based on O-QSPK implementation together with Viterbi encoding which was synthesized, verified and back-annotated. The back annotated design was simulated by means of 1000 Monte-Carlo runs.

As a result, the $E_b/N_0$ ratio of the third exemplary embodiment scored only 2.7 dB below the theoretical limit resulting from equation (1) for a predetermined bit error rate. Similarly, for transmitting a predetermined data rate the third exemplary embodiment requires a receiver sensitivity which is only by 2.7 dB larger than the theoretical limit.

Figure 6:
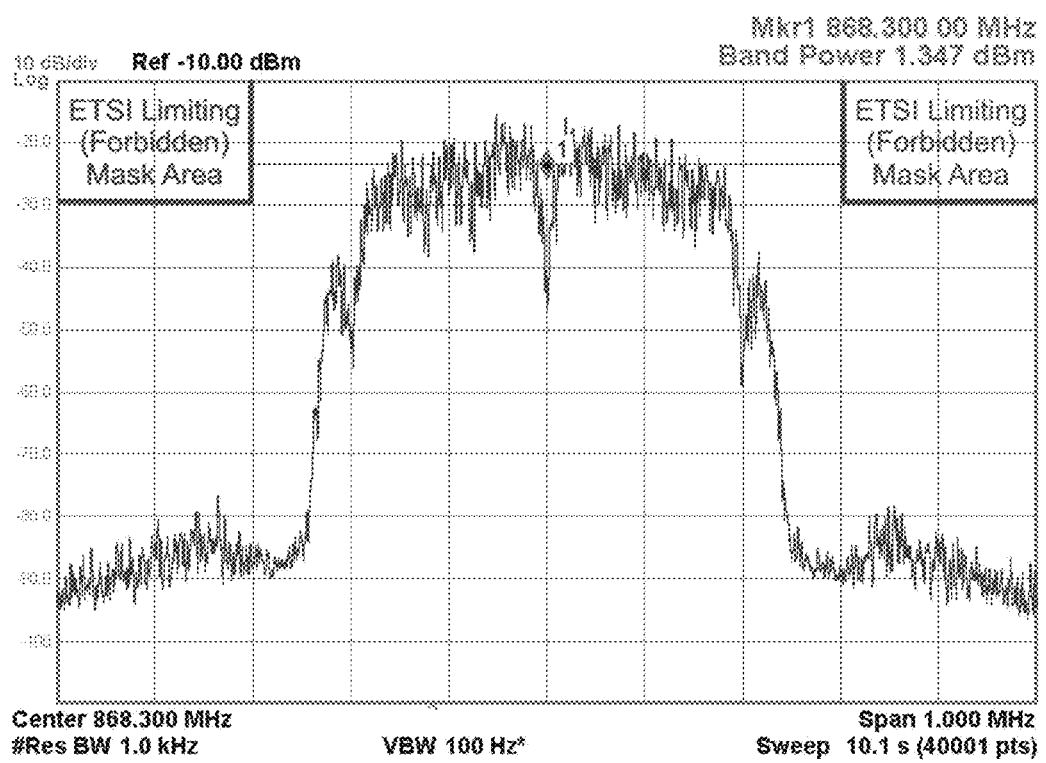
FIG. 6 an exemplary frequency spectrum transmitted according a third exemplary embodiment.

The third exemplary embodiment was provided with payload represented by pseudorandom numbers and from the payload a signal in the g1 band was generated. The generated signal is, as apparent from FIG. 6 within the frequency range allowed by IEEE 802.15.4-2006, said range being between the two vertical lines in FIG. 6.

What is claimed is:

1. A method for determining data from a signal spread over at least one frequency base band representing the data, the data consisting of a portion of the data and a remainder of the data which is complementary to the portion of the data, wherein the portion of the data is modulated on the signal and wherein the method comprises:
    using at least one highly auto-correlated spread code sequence associated with the frequency base band for determining a delay with which a modulated portion of the data is spread on the signal;
    determining said modulated portion from the signal using the delay and the spread code sequence;
    demodulating the modulated portion using phase shift keying; and
    determining the remainder of the data using the delay;
    wherein at least one of the following holds:
        (i) the signal comprises the portion modulated on the at least one baseband as one of an I component and a Q component according to offset quadrature phase shift keying and the signal comprises further data of which a portion is modulated on the at least one baseband as the other of the I component and the Q component, the other component being spread with a further spread code time sequence selected from a set of predetermined spread code sequences and delayed by a further delay determined according to a remainder of the further data, the remainder of the further data being complementary to the portion of the further data, and
        (ii) the signal comprises the portion modulated on different frequency base bands, wherein, for each frequency base band, a different spread code is used wherein the different spread codes differ not only by delays.

2. The method according to claim 1, wherein the data being Viterbi encoded.

3. A device for determining data from a signal spread over at least one frequency base band representing the data, the data consisting of a portion of the data and a remainder of the data which is complementary to the portion of the data, wherein the portion of the data is modulated on the signal, the device comprising:
    means for using at least one highly auto-correlated spread code sequence associated with the frequency base band for determining a delay with which a modulated portion of the data is spread on the signal,
    means for determining said modulated portion from the signal using the delay and the spread code sequence,
    means for demodulating the modulated portion of the data using phase shift keying, and
    means for determining the remainder of the data using the delay;
    wherein at least one of the following holds:
        (i) the signal comprises the portion modulated on the at least one baseband as one of an I component and a Q component according to offset quadrature phase shift keying and the signal comprises further data of which a portion is modulated on the at least one baseband as the other of the I component and the Q component, the other component being spread with a further spread code time sequence selected from a set of predetermined spread code sequences and delayed by a further delay determined according to a remainder of the further data, the remainder of the further data being complementary to the portion of the further data, and (ii) the signal comprises the portion modulated on different frequency base bands, wherein, for each frequency base band, a different spread code is used wherein the different spread codes differ not only by delays.

4. The device according to claim 3, wherein the data being Viterbi encoded.

\* \* \* \* \*